(12) United States Patent
Palmieri et al.

(10) Patent No.: US 10,604,050 B2
(45) Date of Patent: Mar. 31, 2020

(54) MOTOR-VEHICLE SEAT

(71) Applicant: C.R.F. Società Consortile per Azioni, Orbassano (Turin) (IT)

(72) Inventors: Raffaele Palmieri, Orbassano (IT); Giorgio Luigi Masoero, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 16/191,529

(22) Filed: Nov. 15, 2018

(65) Prior Publication Data

US 2019/0152370 A1    May 23, 2019

(30) Foreign Application Priority Data

Nov. 21, 2017    (EP) .................................... 17202705

(51) Int. Cl.
| | | |
|---|---|---|
| B60N 2/80 | (2018.01) | |
| B60N 2/806 | (2018.01) | |
| B60N 2/809 | (2018.01) | |
| B60N 2/829 | (2018.01) | |
| B60N 2/832 | (2018.01) | |
| B60N 2/835 | (2018.01) | |
| B60N 2/856 | (2018.01) | |
| B60N 2/859 | (2018.01) | |
| B60N 2/894 | (2018.01) | |
| B60N 2/64 | (2006.01) | |
| B60N 2/68 | (2006.01) | |

(52) U.S. Cl.
CPC ............. *B60N 2/859* (2018.02); *B60N 2/643* (2013.01); *B60N 2/68* (2013.01); *B60N 2/894* (2018.02)

(58) Field of Classification Search
CPC .......... B60N 2/643; B60N 2/68; B60N 2/844; B60N 2/853; B60N 2/859; B60N 2/874; B60N 2/894
USPC .................................................. 297/61, 408
See application file for complete search history.

(56) References Cited

U.S. PATENT DOCUMENTS 4,711,494 A * 12/1987 Duvenkamp .......... B60N 2/874
297/408 X
6,074,010 A *  6/2000 Takeda ................... B60N 2/856
297/408 X (Continued)

FOREIGN PATENT DOCUMENTS

DE          19528274         10/1996
DE          19914442         10/2000

(Continued)

OTHER PUBLICATIONS

European Search Report dated May 14, 2018 (3 pages).

*Primary Examiner* — Rodney B White
(74) *Attorney, Agent, or Firm* — RMCK Law Group PLC

(57) ABSTRACT

A motor-vehicle seat, in particular a rear motor-vehicle seat, includes a backrest frame having an upper cross-member, and a headrest connected to the upper cross-member and tiltable between an upright operative position and an inoperative position rotated forwardly relative to the operative position. The headrest is rotatably mounted on the upper cross-member of the backrest frame, whereby it is adapted to tilt between its operative and inoperative positions around a transversal axis which is vertically located substantially at the same height of the cross-member.

6 Claims, 8 Drawing Sheets

(56) References Cited

U.S. PATENT DOCUMENTS

Figure 1:
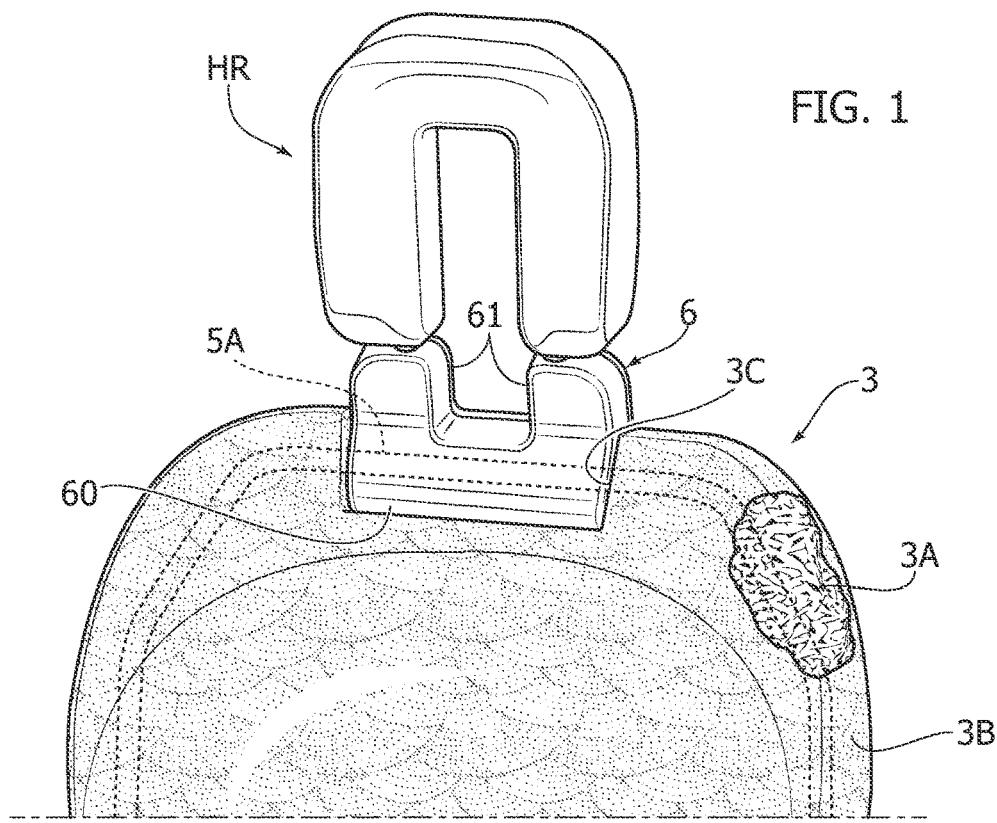

| | | | | |
|---|---|---|---|---|
| 6,508,512 B2 * | 1/2003 | Saberan | ............... | B60N 2/818 |
| | | | | 297/408 |
| 8,616,650 B2 * | 12/2013 | Markel | ............... | B60N 2/36 |
| | | | | 297/408 |
| 8,926,020 B2 * | 1/2015 | Jeong | ............... | B60N 2/888 |
| | | | | 297/408 |
| 2006/0012233 A1 * | 1/2006 | Karlberg | ............... | B60N 2/856 |
| | | | | 297/408 |
| 2008/0277990 A1 | 11/2008 | Yasukawa et al. | | |
| 2011/0285194 A1 * | 11/2011 | Marom | ............... | B60N 2/856 |
| | | | | 297/404 |
| 2012/0212025 A1 * | 8/2012 | Schroeder | ............... | B60N 2/874 |
| | | | | 297/391 |
| 2013/0334860 A1 * | 12/2013 | Adams | ............... | B60N 2/859 |
| | | | | 297/408 |
| 2014/0333098 A1 * | 11/2014 | DeForest | ............... | B60N 2/002 |
| | | | | 297/61 |
| 2018/0065522 A1 * | 3/2018 | Muldowney | ............... | B60N 2/856 |

FOREIGN PATENT DOCUMENTS

| | | |
|---|---|---|
| DE | 10145240 | 4/2003 |
| DE | 102008059988 A1 | 6/2009 |

\* cited by examiner

MOTOR-VEHICLE SEAT

CROSS-REFERENCE TO RELATED APPLICATION

This application claims priority to European Patent Application No. 17 202 705.4 filed Nov. 21, 2017. The disclosure of the above application is incorporated herein by reference in its entirety.

FIELD OF THE INVENTION

The present invention relates to motor-vehicle seats and in particular to rear motor-vehicle seats. Still more in particular, the invention relates to a rear motor-vehicle seat comprising a backrest frame including an upper cross-member, and a headrest connected to said upper cross-member and tiltable between an upright operative position and an inoperative position rotated forwardly relative to the upright position.

PRIOR ART

Seats of the type indicated above are for example disclosed in documents U.S. Pat. Nos. 8,616,650 B2, 6,508,512 B2, 6,074,011, 7,008,019 B2.

In rear seats of the type indicated above, the headrest is moved to its upright operative position when the rear seat is occupied, while it is moved to its inoperative position, rotated forwardly, by about 90°, when the rear seat is not occupied, so as not to obstruct the driver's view through the internal rear-view mirror of the motor-vehicle. The headrest can be also movable to said inoperative position in cases in which the backrest of the rear seat can be fully lowered, for extending the luggage compartment of a motor-vehicle with a tailgate. At least in some of the aforementioned known solutions, it is provided that when the headrest is in its inoperative position, the headrest interferes with the back of an occupant of the rear seat, so as to force the occupant to bring the headrest to its operative position, in order to use the headrest correctly.

Document DE 101 45 240 A1 discloses a seat of the above indicated type wherein the headrest is rotatably mounted on an upper cross-member of a backrest frame, so that it is adapted to tilt between its operative and inoperative positions around a transversal axis which is coincident with a longitudinal central axis of said cross-member. Also, in this known solution, the seat comprises a backrest with a padding body which contains therein the backrest frame, wherein the padding body has a recessed portion in its upper part, so as not to cover a portion of the upper cross-member of the frame of the backrest. On that portion of the upper cross-member of the backrest frame a body is rotatably mounted, for supporting the headrest, which is therefore adapted to tilt around the axis of the cross-member for displacing the headrest between its operative and inoperative positions.

Similar solutions are also known from DE 199 14 442 A1, US 2008/277990 A1, DE 10 2008 059988 A1 and DE 195 28 274 C1.

OBJECT OF THE INVENTION

The object of the present invention is to provide a rear motor-vehicle seat of the type indicated above which results to be more simple and more functional with respect to the known solutions.

SUMMARY OF THE INVENTION

In view to achieve the aforementioned object, the subject of the invention is a motor-vehicle seat, in particular a rear motor-vehicle seat, comprising a backrest frame including an upper cross-member, and a headrest connected to said upper cross-member, and tiltable between an upright operative position and an inoperative position rotated forwardly relative to the operative position, wherein said headrest is rotatably mounted on said upper cross-member of the backrest frame, so that it is adapted to tilt between said operative and inoperative positions around a transversal axis which is coincident with a longitudinal central axis of said cross-member, wherein said seat comprises a backrest with a padding body which contains therein the backrest frame, wherein said padding body has a recessed portion in its upper part, so as not to cover a portion of the upper cross-member of the frame of the backrest and wherein on that portion of the upper cross-member of the backrest frame a body is rotatably mounted, for supporting the headrest, which is therefore adapted to tilt around the axis of the cross-member for displacing the headrest between its operative and inoperative positions, said seat being characterized in that:
one or more supporting rods supporting the headrest are slidably mounted within said supporting body of the headrest, said supporting rods are adapted to be received within through openings formed through the upper cross-member of the backrest frame when the headrest is in its operative position, said supporting rods are adapted to be received against forwardly facing stop seats, defined by supports secured to said upper cross-member of the backrest frame, when the headrest is in its inoperative position, between the supporting body of the headrest and said supporting rods which are slidably mounted within said supporting body there are interposed elastic devices which tend to push the supporting rods of the headrest within said through openings of the upper cross-member of the backrest frame, when the headrest is in its upright operative position, and against said stop seats, when the headrest is in its forwardly rotated inoperative position.

In the present description, and in the claims which follow, with the expression "transversal axis" an axis is meant which, in the mounted condition of the motor-vehicle seat, results to be directed horizontally and perpendicularly with respect to the longitudinal direction of the motor-vehicle. At the same time, the expression "forwardly" refers to the orientation of the seat on the motor-vehicle.

Starting from its upright operative position, the headrest can be moved to an inoperative position rotated forwardly by about 90° by means of a first lifting movement, which brings the aforementioned supporting rods to come out from the respective through openings of the upper cross-member of the backrest frame, by overcoming the action of the aforementioned elastic devices and by means of a subsequent rotating movement, until reaching the inoperative position, rotated forwardly by about 90°, in which the aforementioned elastic devices push the supporting rods of the headrest in contact with their respective seats associated to the upper cross-member of the backrest frame, on the front surface of this latter.

As evident from the foregoing, the support device of the headrest provided in the seat according to the invention is extremely simple and functional. Above all, the rotation of the headrest between its operative position and its inoperative position occurs around a transversal axis which is substantially coincident with the axis of the upper cross-member of the backrest frame, since the supporting body of the headrest is rotatably mounted on said cross-member.

The seat of the invention has a structure which is extremely simple, inexpensive and at the same time completely reliable in terms of resistance of the head support to the stresses to which it can be subjected in the event of a collision of the motor-vehicle.

DETAILED DESCRIPTION OF A PREFERRED EMBODIMENT

Figure 2:
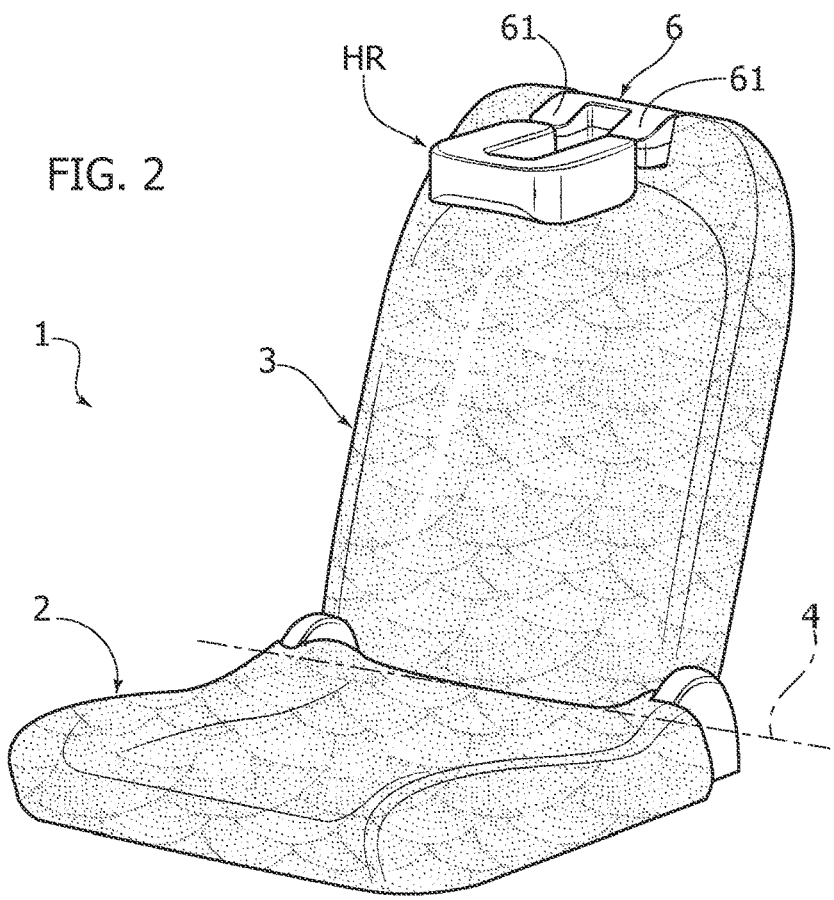
Figure 3:
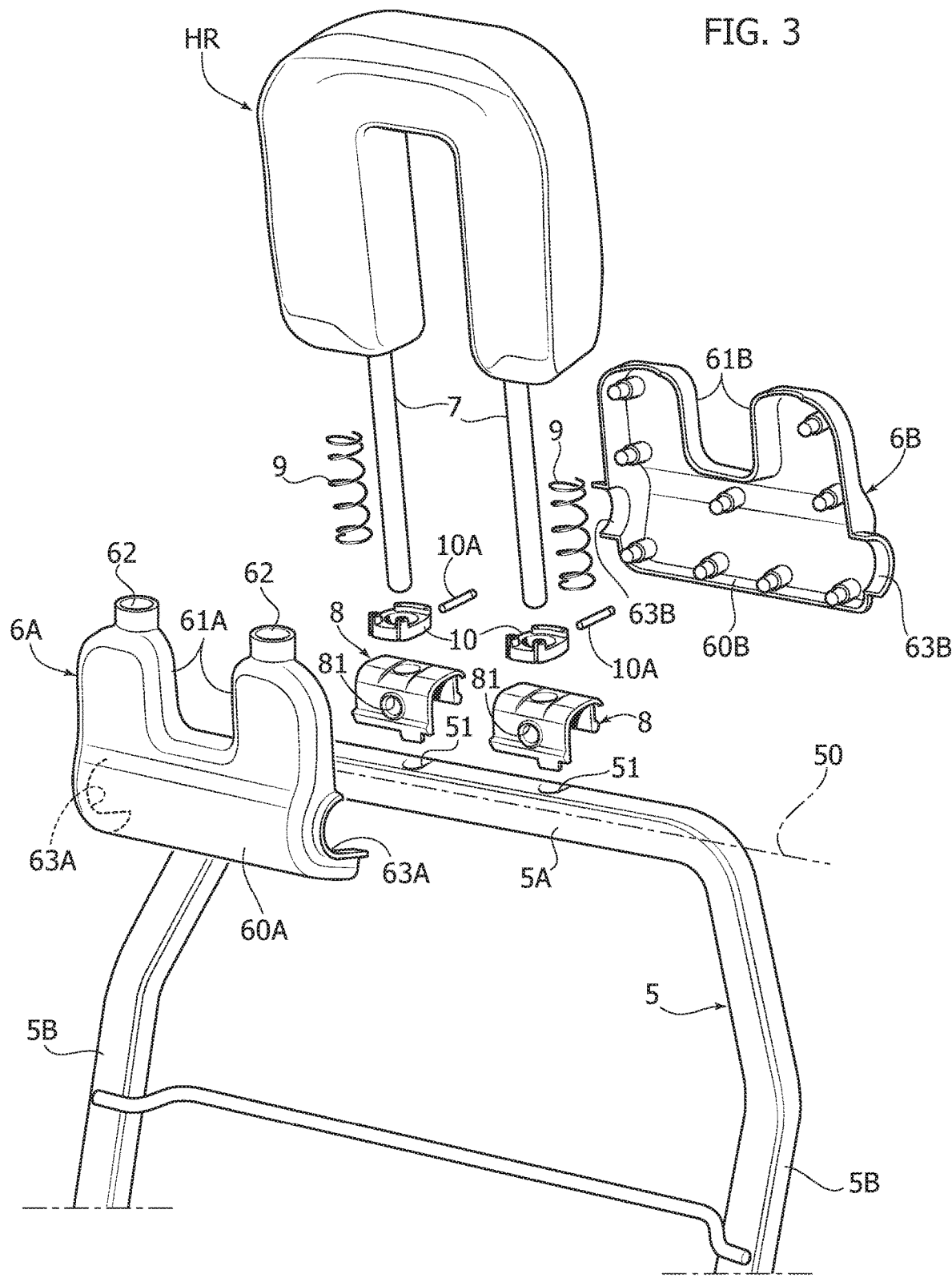
Figure 4:
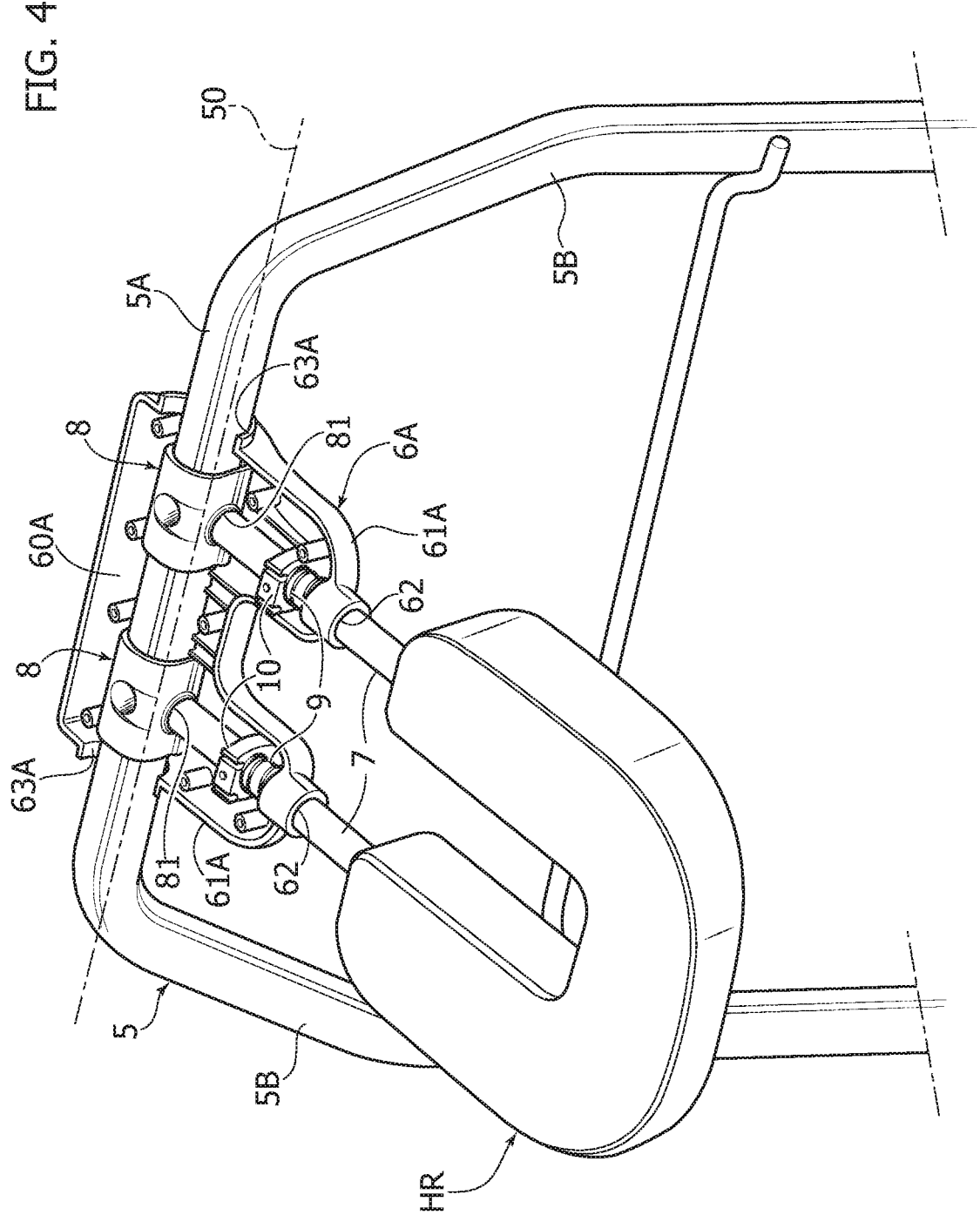
Figure 5:
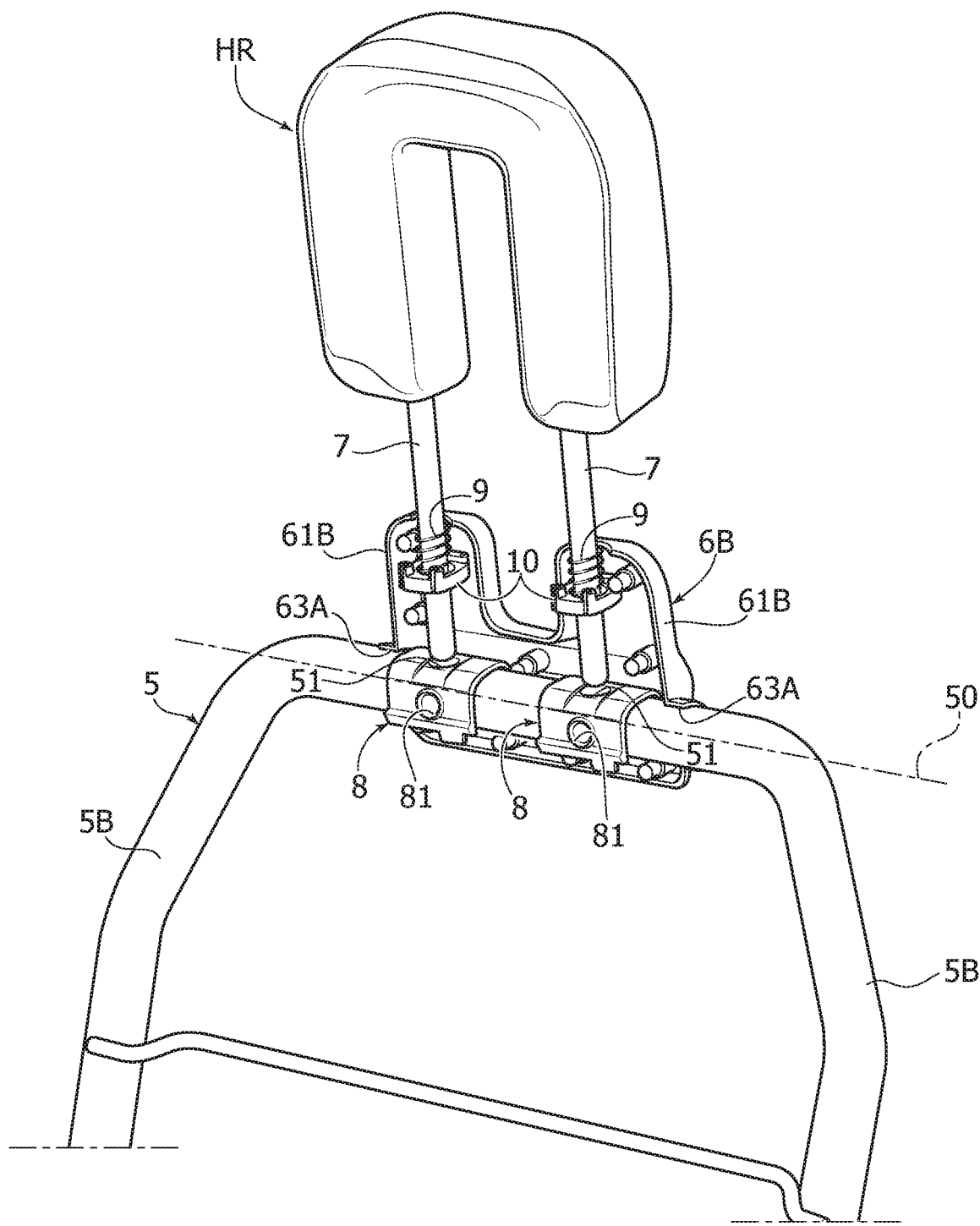
Figure 6:
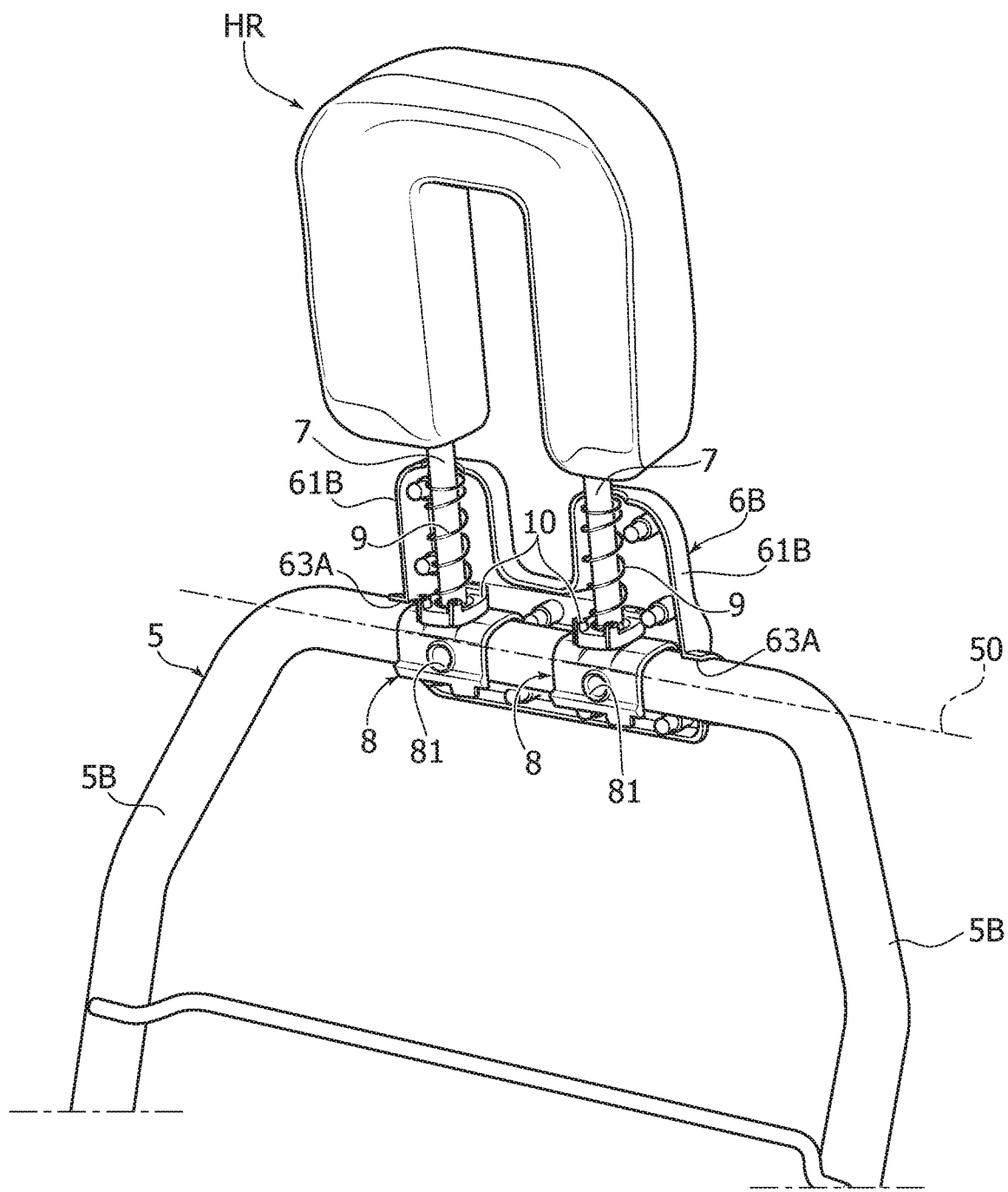
Figure 7:
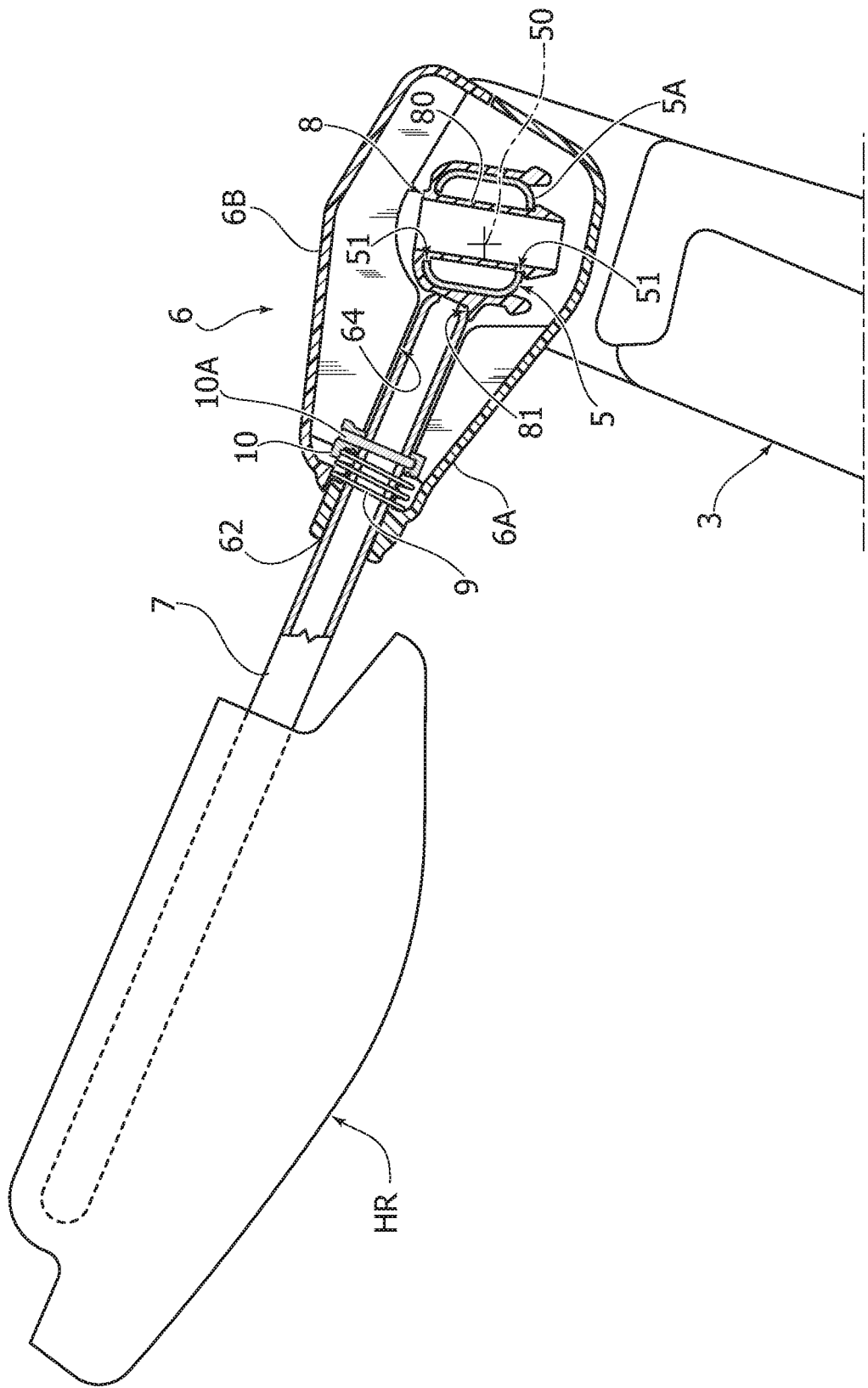
Figure 8:
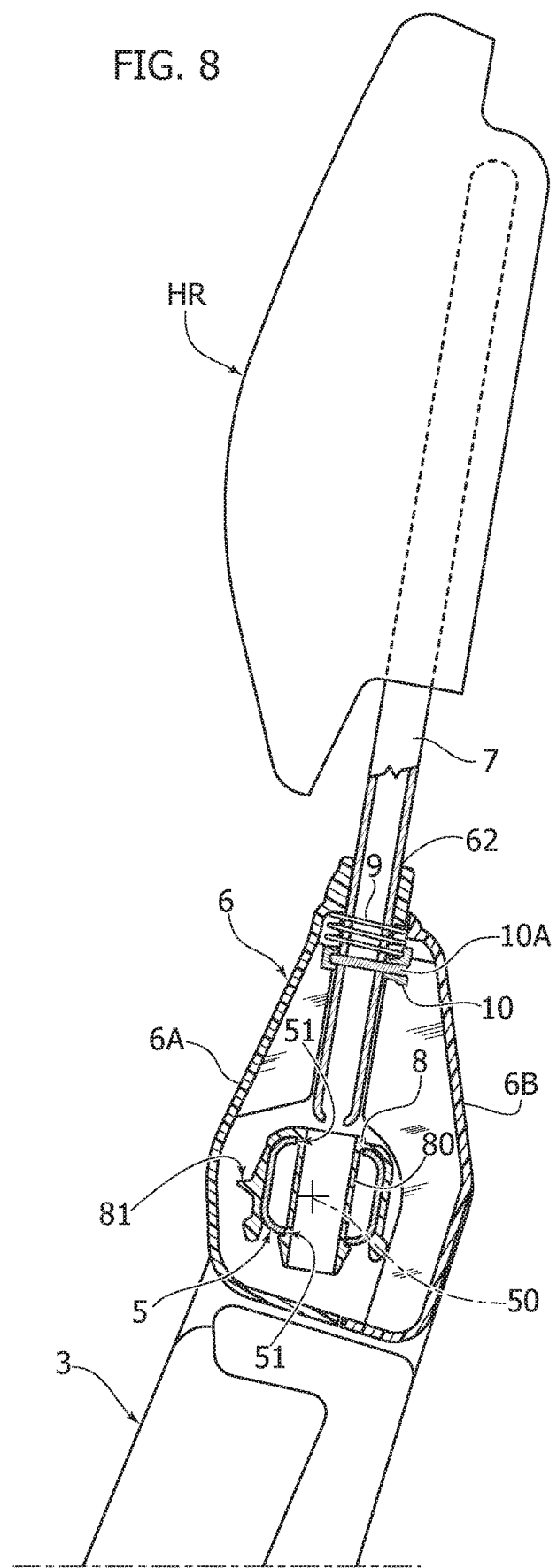
Figure 9:
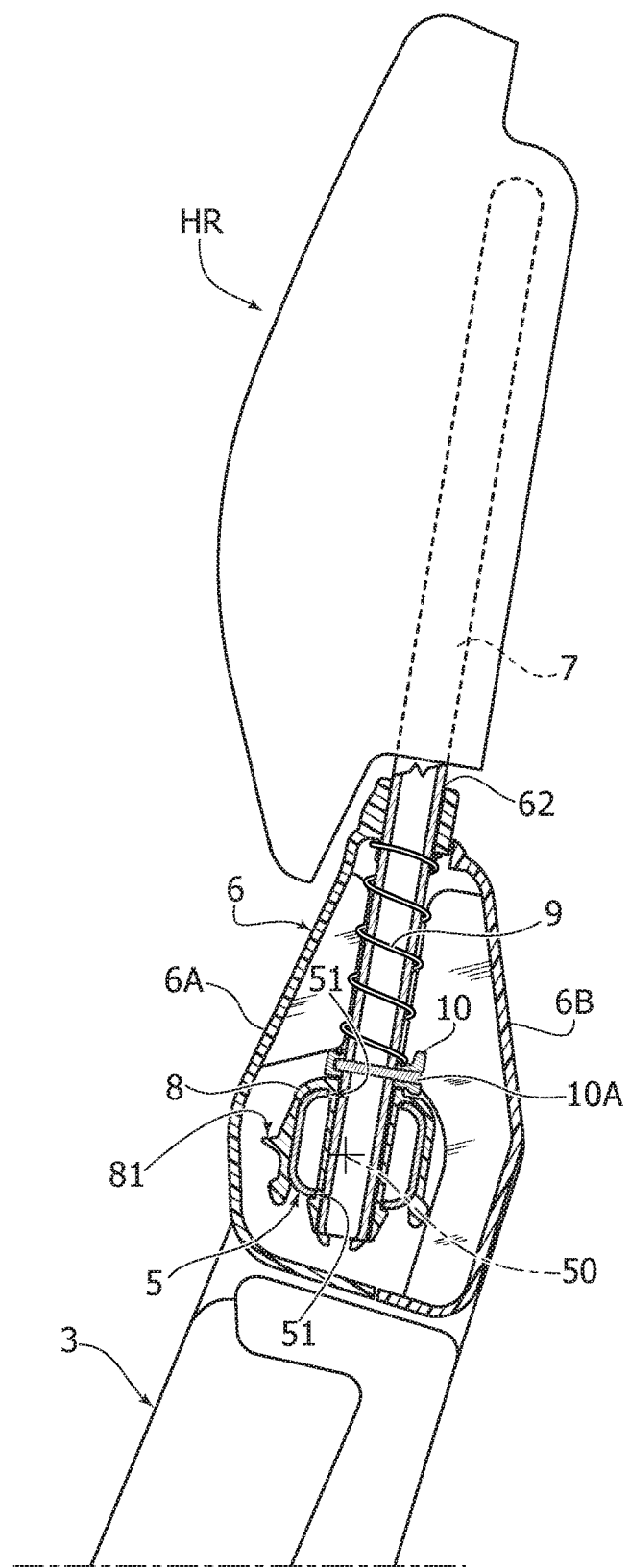

FIG. 1 is a perspective partial view of a preferred embodiment of the present invention, which illustrates the headrest in its upright operative position, FIG. 2 is a perspective view of the seat of FIG. 1, with the headrest illustrated in its inoperative position, FIG. 3 is an exploded perspective view of the supporting structure of the headrest of the seat of FIGS. 1, 2, FIGS. 4, 5 and 6 are perspective views, partially in cross-section, which show the headrest in its inoperative position (FIG. 4), in its operative position (FIG. 6) and in an intermediate position between the inoperative and operative positions (FIG. 5), and FIGS. 7-9 are cross-sectional views of the supporting structure of the headrest in the positions respectively illustrated in FIGS. 4, 5 and 6.

With reference to FIGS. 1, 2, the reference number 1 generally designates a motor-vehicle seat, in particular a rear motor-vehicle seat. It should be noted that the annexed drawings show a single rear seat, while it is evident that the present invention is applicable to any configuration of rear seat, including the case of a rear seat with a couch-like configuration with a single backrest or a backrest divided in two or more sections, with each section being fully lowerable on the seat cushion, in order to extend the luggage compartment of a motor-vehicle with tailgate.

It should also be noted that the invention is applicable both to rear seats with a fully forwardly lowerable backrest, and to rear seats of sedan motor-vehicles wherein the rear seat backrest cannot be fully lowered forwardly.

Furthermore, the particular conformation of the seat which is illustrated in the annexed drawings is herein indicated only by way of example. As a matter of fact, the invention is applicable to any kind of seat configuration, whatever are the structure and configuration of the cushion seat and the backrest seat.

Returning to FIGS. 1, 2 of the annexed drawings, the seat 1 comprises a cushion 2 and a backrest 3 which in the case of the illustrated example is pivoted at its bottom around an axis 4 which is transversal to the cushion structure 2. In general, both the cushion 2 and the backrest 3 provide a supporting frame contained within a padding body of foamed plastic material provided with a cover, for example made of fabric, leather or synthetic material. All the construction details relative to these components are not described and illustrated herein as they can be of any known-type and do not fall, taken alone, within the scope of the present invention. The same applies to the devices which are provided in rear seats with a fully lowerable backrest, such as that shown in the annexed drawings, for the purpose of locking the backrest in the upright operative position or to any other guide and adjustment device, used for enabling an adjustment of the longitudinal position and/or the height of the seat relative to the floor of the motor-vehicle on which the seat is mounted.

The invention is equally applicable also in mini-van motor-vehicles with more than two rows of seats, to any seat of the rear rows and is equally applicable also to seats of the type in which both the cushion and the backrest can be moved in a configuration of minimum bulk, for enabling access of passengers to a rear row.

The only essential component for the application of the present invention is the presence in the backrest 3 of a supporting frame 5 (see FIGS. 3-6) which includes an upper cross-member 5A or any other equivalent element.

In the example shown in FIGS. 3-6, the frame 5 of the backrest 3 is in the form of a metallic tubular frame, having a quadrangular cross-section with rounded vertices (FIG. 7), including two uprights 5B joined together by the upper cross-member 5A. As mentioned, the configuration of the backrest frame can also be completely different from the one here illustrated, the only essential condition being that the frame 5 includes an upper cross-member or other equivalent element.

With reference to FIG. 1, the frame 5 of the backrest 3 is embedded, according to the conventional art, in a padding body 3A of foamed plastic material provided with a cover 3B, for example of fabric, leather or synthetic material. However, as can be seen in FIG. 1, in the middle of the upper edge of the backrest 3 the padding body 3A has a recessed portion 3C which leaves a central portion of the upper cross-member 5A of the frame 5 outside the padding body 3A.

On the central portion of the upper cross-member 5A of the backrest frame which is free from the padding body 3A a supporting body 6 is rotatably mounted, for supporting a headrest HR.

As illustrated in FIG. 3, the supporting body 6 is constituted by two half-shells of plastic material 6A, 6B rigidly connected to each other, for example by means of gluing and/or screwing, so as to define a main portion 60 rotatably mounted above the central portion of the cross-member 5A and two guide portions 61 which protrude radially from the main portion 60 and which act as a guide for two supporting rods 7 for supporting the headrest HR.

It should be noted that the conformation and the structure of the headrest HR can be of any type, and in particular may also differ from those illustrated purely by way of example in the annexed drawings. Likewise, the headrest can be provided with supporting rods 7 of any conformation or with any other equivalent element. It is also evident that the connection between the supporting rods 7 and the headrest HR can be provided by any device of known type for enabling for example an adjustment of the height of the headrest HR in its upright operative position.

In FIG. 3, the different parts of the two half-shells 6A, 6B which constitute the supporting body 6 are indicated with the same reference numbers used for the member 6 as a whole, except for the addition of the letters A and B. Therefore, the main part 60 of the supporting body 6 is defined by two semi-cylindrical portions 60A, 60B of the half-shells 6A, 6B which embrace the upper cross-member 5A therebetween in their assembled condition. Similarly, the two portions 61 of the support member 6 are defined by portions 61A, 61B of the two half-shells 6A, 6B which in the assembled condition, define a cavity therebetween within which the supporting rods 7 are received. The half-shell 6A further incorporates two guide bushings 62, for slidably guiding the two supporting rods 7 (see also FIGS. 7-9).

With reference in particular to FIGS. 3-9, the upper cross-member 5A of the backrest frame has a hollow section (better seen in FIG. 7-9) and two pairs of through openings 51 which enable the rods 7 to be received through the cross-member 5A in the operative position of the headrest HR.

Still with reference to FIG. 3, the portions 60A, 60B of the two half-shells 6A, 6B have opposite ends which define half-bushings 63A, 63B which in the coupled condition define bushings for rotatably supporting the body 6 on the cross-member 5A around a transversal axis 50 (see in particular FIG. 7) which is coincident with the longitudinal central axis of the cross-member 5A. In general, the rotatable support of the body 6 on the cross-member 5A enables the rotation of the headrest HR around a transversal axis substantially arranged at the same height of the cross-member 5A.

Still with reference in particular to FIGS. 3-5, two channel-shaped supports 8 of plastic material are secured on the upper cross-member 5A of the backrest frame. The two supports 8 are mounted straddling of the upper cross-member 5A and each incorporates in one piece a bushing 80 which extends through the openings 51 of the cross-member 5A and acts as a guide for the supporting rods 7 of the headrest HR in the upright operative position of the headrest. Each guide bushing 80 has an enlarged end head which engages with the lower surface of the cross-member 5A when the respective support 8 is mounted on the cross-member 5A.

The outer surface of a flange of the channel-shaped body of each support 8 which faces forwardly (with reference to the mounting condition of the seat on the motor-vehicle) defines a stop seat 81 (see FIGS. 7-9) for the end of the respective supporting rod 7, in the inoperative position of the headrest HR (see FIG. 7).

Each of the two supporting rods 7 is guided within the respective bushing 62 of the half-shell 6A, and within guiding passages 64 defined by the inner surfaces of the two half-shells 6A, 6B.

In the upright operative position of the headrest, each rod 7 is biased towards its engagement position through the respective guiding bushing 80 and through the cross-member 5A by a respective helical spring 9 which has its upper end (with reference to FIG. 9) engaged in contact with the inner surface of the half-shell 6A and its lower end engaged in contact with a stop support 10 which has an annular body mounted around the respective rod 7 and anchored to said rod by means of a transversal pin 10A.

The operation of the structure described above is as follows.

In the upright operative position of the headrest (see FIGS. 1, 5, 9), the entire body of the supporting member 6 is in an upright position with respect to the cross-member 5A, in such a way that the headrest HR is in its upright operative position. In this position, the springs 9 are in their configuration of maximum elongation, because they maintain the respective supporting rod 7 in engagement through the upper cross-member 5A of the backrest frame. As can be seen in FIG. 9, in this condition the ends of each supporting rod 7 protrude below the upper cross-member 5A and are received within the respective end of the guiding bushings 80, which also protrude below the upper cross-member 5A.

In the aforementioned operative position of the headrest HR, the headrest can be correctly used by an occupant of the rear seat. The forces to which the headrest can be subjected due to an impact against the head of the occupant, because of a collision of the motor-vehicle, are supported in a correct and reliable manner by the headrest, thanks to the engagement of the supporting rods 7 through the openings 51 formed in the upper and lower walls of the cross-member 5A.

Starting from the upright operative position of FIG. 9, the headrest HR can be rotated forwardly by an angle of about 90°, until reaching the inoperative position shown in FIG. 2. This rotation occurs thanks to the rotation of the entire body of the supporting member 6 around a pivot axis 50 with respect to the upper cross-member 5A. However, this rotation can only take place after that the supporting rods 7 come out from the engagement within the guide bushings 80 and within the cross-member 5A. It is therefore necessary, in a first time, to move the headrest HR to its intermediate position shown in FIGS. 5 and 8. This can be achieved by manually lifting the headrest against the action of the springs 9, until the supporting rods 7 are brought to the position shown in FIGS. 5, 8, in which the rods come out completely from their engagement within the guiding bushings 80 and within the cross-member 5A. By maintaining the headrest HR in the position shown in FIG. 8, it is then possible to rotate the headrest forwardly, by rotating the entire body of the supporting member 6 around the transversal axis 50. Once the headrest HR has been rotated by an angle sufficient to misalign the rods 7 with respect to the bushings 80, the headrest can also be released, enabling the springs 9 to move the ends of the rods 7 in sliding contact with the outer surface of the two supports 8, while the rotation of the headrest continues. This rotation stops when the headrest reaches the position shown in FIGS. 4, 7, in which the ends of the supporting rods 7 are received against the seats 81.

In this inoperative position, the headrest HR is out from the interference with the driver's view through the internal rear-view mirror of the motor-vehicle. At the same time, thanks to the fact that the transversal axis 50 of rotation of the headrest HR is in a relatively low position, that is substantially at the height of the upper cross-member 5A of the backrest, below the upper edge of the padding body of the backrest, the position of the headrest in its inoperative condition is certainly such as to render difficult, if not impossible, that the rear seat is occupied by a passenger. The headrest according to the invention thus provides a safe deterrent against the improper use of the headrest. Furthermore, in the case in which the backrest is of the type illustrated herein, which can be fully tilted forwardly for extending the luggage compartment of a motor-vehicle with tailgate, the lower position of the tilting axis of the headrest reduces the degree of interference with the backrest of the front seat in the fully-lowered condition of the backrest of the rear seat, which may enable for example the backrest to be fully lowered without the necessity to move preliminarily the front seat to a more advanced position.

The preferred embodiment which is described herein represents, of course, only one example. Without prejudice to the fundamental principle of the present invention, which is that of enabling the headrest to tilt around a transversal axis which is vertically located below the upper edge of the backrest, substantially at the same height of a cross-member of the backrest frame, the way in which the headrest is configured and the way with which its rotation is guided, can widely vary. For example, it is included, among the applications of the present invention, also the case in which the rotation of the headrest between its operative and inoperative positions is motorized, or else the case where the headrest is provided with an elastic device which tends to move the headrest to its forwardly rotated position, and a latching device for retaining the headrest in its upright operative position, this latching device being releasable by the driver, by means of a remote control member, accessible from the driving seat. In this way, if an occupant of a rear seat has left the motor-vehicle with the headrest of the rear seat in its upright position, as it may presumably happen, the diver can operate a remote control for causing the rotation of the headrest to its inoperative position.

More generally, without prejudice to the principle of the invention, the details of construction and the embodiments may widely vary with respect to those described and illustrated, without thereby departing from the scope of the present invention, as defined in the annexed claims.

What is claimed is:

1. A motor-vehicle seat having a backrest frame including an upper cross-member, and a headrest connected to said upper cross-member, and tiltable between an upright operative position and an inoperative position rotated forwardly relative to the operative position, the motor-vehicle seat including:
    said headrest being rotatably mounted on said upper cross-member of the backrest frame, so that it is adapted to tilt between said operative and inoperative positions around a transversal axis which is coincident with a longitudinal central axis of said upper cross-member,
    a backrest with a padding body which contains therein the backrest frame, wherein said padding body has a recessed portion in its upper part, so as not to cover a portion of the upper cross-member of the backrest frame of the backrest, and on the portion of the upper cross-member of the backrest frame, a supporting body is rotatably mounted, for supporting the headrest, which is therefore adapted to tilt around the transversal axis for displacing the headrest between its operative and inoperative positions,
    wherein:
    one or more supporting rods supporting the headrest are slidably mounted within said supporting body of the headrest,
    said supporting rods are adapted to be received within through openings formed through the upper cross-member of the backrest frame when the headrest is in its operative position,
    said supporting rods are adapted to be received against stop seats associated to said upper cross-member of the backrest frame, on a front surface of the upper cross-member, when the headrest is in its inoperative position, and
    between the supporting body of the headrest and said supporting rods which are slidably mounted within said supporting body, there are interposed elastic devices which are configured to push the supporting rods of the headrest within said through openings of the upper cross-member of the backrest frame, when the headrest is in its upright operative position, and against said stop seats, when the headrest is in its forwardly rotated inoperative position.

2. The seat according to claim 1, wherein on the upper cross-member of the backrest frame of the backrest, two channel-shaped supports of plastic material are secured, which are mounted astride of the upper cross-member, and wherein each of said supports incorporates a bushing in one piece therewith, which bushing extends through said through openings of the upper cross-member and which acts as a guide for the respective supporting rod of the headrest in the upright operative position of the headrest.

3. The seat according to claim 2, wherein a forwardly facing flange of a channel-shaped body of each channel-shaped support defines a respective one of said stop seats.

4. The seat according to claim 1, wherein the seat comprises a motor for driving rotation of the headrest between its operative and inoperative positions.

5. The seat according to claim 1, wherein the seat comprises a further elastic device which is configured to bring the headrest to its position which is rotated forwardly, and a latching device for retaining the headrest in its upright operative position, said latching device being remotely releasable by the driver, by a control member accessible from a driver's seat.

6. The seat according to claim 1, wherein the seat comprises a rear seat of the motor-vehicle.

* * * * *